N. E. JAEGER.
DRESS MEASURING DEVICE.
APPLICATION FILED AUG. 28, 1908.
928,454.
Patented July 20, 1909.
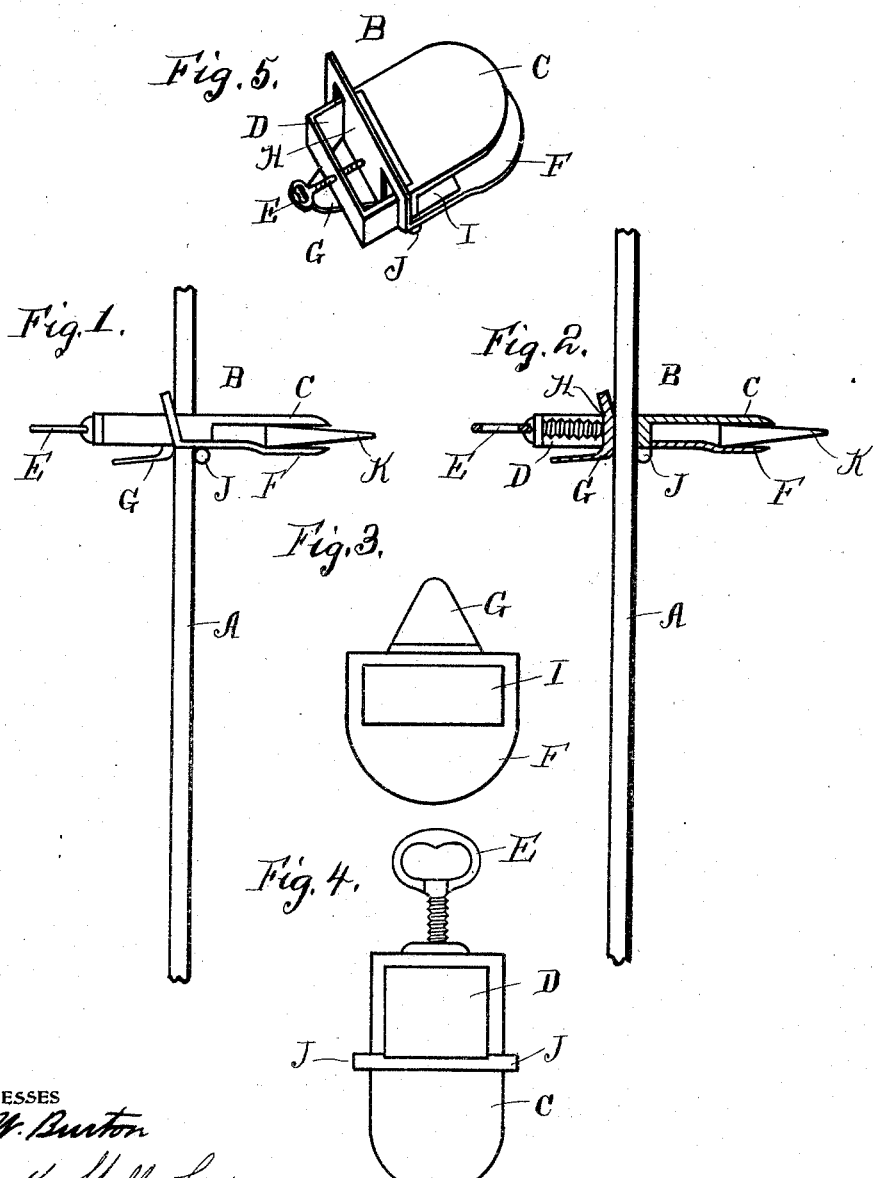
WITNESSES
H. W. Burton
S. M. Gallagher
INVENTOR
Nellie E. Jaeger
BY
W. Preston Williamson ATTORNEY

UNITED STATES PATENT OFFICE.

NELLIE E. JAEGER, OF PHILADELPHIA, PENNSYLVANIA.

DRESS-MEASURING DEVICE.

No. 928,454. Specification of Letters Patent. Patented July 20, 1909.

Application filed August 28, 1908. Serial No. 450,701.

*To all whom it may concern:*

Be it known that I, NELLIE E. JAEGER, a citizen of the United States, residing at Philadelphia, county of Philadelphia, and State of Pennsylvania, have invented a certain new and useful Improvement in Dress-Measuring Devices, of which the following is a specification.

My invention relates to a new and useful improvement in dress measuring devices, and has for its object to provide an exceedingly simple and effective device of this character whereby the chalk may be adjustably held on the measuring stick so that a person may take their own measurements in determining the length of a skirt.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a side elevation of my improved dress measuring device. Fig. 2, a side elevation of the measuring stick, the chalk holding member being shown in section. Fig. 3, a plan view of the spring jaw of the chalk holding member. Fig. 4, a similar view of the upper or cast metal jaw, and Fig. 5, is a perspective view of the chalk holding device.

In carrying out my invention as here embodied, A represents a measuring stick which may be of any desired length having any suitable graduations thereon, said measuring stick might be a yard-stick on which is placed the chalk holding device.

B represents the chalk holding member or device composed of an upper jaw C in the rear of which is formed an opening D. In the rear portion of the jaw C is threaded a set screw E, the end of which extends into the opening D and is adapted to come in contact with the spring jaw as will be hereinafter described.

F denotes the lower jaw which is composed of spring metal from the rear of which is formed a downwardly and rearwardly extending lug G which is bent on a suitable angle as indicated by H. Against this lug is adapted to rest the inner end of the set screw E.

The reference letter I indicates an opening formed toward the rear of the jaw F to allow the measuring stick to pass therethrough.

J represents lugs formed on either side of the upper jaw C in such a manner as to bring them below the under face of said jaw, and on these rests the lower jaw F so that said jaw will rock thereon.

In practice the forward portion of the upper jaw C is passed through the opening I in the lower jaw and the lug G of said lower jaw is then allowed to pass through the opening D in the upper jaw so that the said lower jaw will rest on the lugs J of the upper jaw C. The measuring stick is then passed through the openings D and J so that the upper jaw will press against one side of said measuring stick and the lug G of the lower jaw F will press against the other side of the measuring stick, then by threading the set screw E inward it will bring the lug G against the measuring stick, and by further tightening the set screw will draw the lower jaw F toward the upper jaw C because of the angle on which the lug G is bent. These jaws coming closer together will firmly take hold of the chalk K, thus it will be seen that by tightening the set screw E the chalk holding member will be held in any desired position on the measuring stick, and at the same time the chalk will be firmly held between the jaws thereof.

By backing off the set screw E the chalk holding member may be moved up or down on the measuring stick or the chalk may be removed and a new piece inserted in its place.

In practice when a woman has made a skirt for herself she is unable to cut it so as to produce the same length without the help of another person but by the use of my improvement said woman may place the skirt upon herself and when standing up adjust the chalk holder on the measuring stick until it comes below the hip line when the lower end of the measuring stick is resting upon the ground or floor, then by moving the device around the body the end of the stick resting upon the ground or floor and the chalk against the skirt it will cause a line to be drawn on the skirt an equal distance from the floor, then by removing the skirt and laying it upon a table and adjusting the chalk holder to the number of inches that the bottom of the skirt is to be above the floor then taking the end of the stick and running it along the line made by the chalk it will cause another line to be made by the chalk in proximity to the bottom of the skirt, and when the skirt is cut on this line it will hang the desired distance from the ground and will be the same distance therefrom at all points when on the wearer.

Of course I do not wish to be limited to the exact details here shown as the chalk holder may be made of a spring metallic member so formed as to produce fingers which would extend around the measuring stick and a spring clip for holding the chalk.

Having thus fully described my invention, what I claim as new and useful, is—

1. In a dress measuring device, a measuring stick, a chalk holder composed of an upper jaw having an opening formed in the rear portion thereof, lugs formed with said jaw, a lower jaw formed from spring metal, a downwardly rearwardly extending lug formed therewith bent on a suitable angle, and means for closing the jaws upon a piece of chalk and pressing said jaws against the sides of the measuring stick at the same time, as shown and described.

2. In a dress measuring device, a measuring stick, a chalk holder composed of an upper jaw having an opening formed in the rear portion thereof, lugs formed with said jaw, a lower jaw formed from spring metal, a downwardly rearwardly extending lug formed therewith bent on a suitable angle, and a set screw threaded into the rear portion of the upper jaw the inner ends of which are adapted to rest against the downwardly rearwardly extending lug, and when said set screw is threaded inward it will cause the jaws to move together and at the same time press them against the sides of the measuring stick, as shown and described.

In testimony whereof, I have hereunto affixed my signature in the presence of two subscribing witnesses.

NELLIE E. JAEGER.

Witnesses:
H. ELLENBERG, Jr.,
E. JENNIE BROOKS.